US007291993B2

(12) United States Patent
Bai et al.

(10) Patent No.: US 7,291,993 B2
(45) Date of Patent: Nov. 6, 2007

(54) METHOD FOR DRIVING A FLUORESCENT LAMP AND AN INVERTER CIRCUIT FOR PERFORMING SUCH A METHOD

(75) Inventors: Shwang-Shi Bai, Hsinhua (TW); Yu-Pei Huang, Hsinhua (TW)

(73) Assignee: Himax Technologies, Inc., Tainan County (TW)

( * ) Notice: Subject to any disclaimer, the term of this patent is extended or adjusted under 35 U.S.C. 154(b) by 0 days.

(21) Appl. No.: 11/624,068

(22) Filed: Jan. 17, 2007

(65) Prior Publication Data

US 2007/0120504 A1 May 31, 2007

Related U.S. Application Data

(62) Division of application No. 11/198,143, filed on Aug. 4, 2005.

(30) Foreign Application Priority Data

Apr. 20, 2005 (TW) .............................. 94112524 A

(51) Int. Cl.
*G05F 1/00* (2006.01)
*H02M 3/335* (2006.01)

(52) U.S. Cl. ................. 315/307; 315/291; 315/209 R; 315/224; 315/247; 363/21.02; 363/21.03; 363/21.04; 363/21.06

(58) Field of Classification Search .. 363/21.02–21.04, 363/21.06, 21.1, 21.11–21.21; 315/291, 315/307, 224, 225, 308, 209 R, 246, 247
See application file for complete search history.

(56) References Cited

U.S. PATENT DOCUMENTS 3,579,078 A * 5/1971 Cronin et al. ................. 363/17
6,563,275 B2 * 5/2003 Ito et al. ..................... 315/308
2004/0179381 A1 * 9/2004 Eguchi et al. ................ 363/66

* cited by examiner

*Primary Examiner*—Tuyet Vo
(74) *Attorney, Agent, or Firm*—J.C. Patents

(57) ABSTRACT

A method for driving a fluorescent lamp and an inverter circuit for performing the same are used to reduce an amount of electromagnetic interference (EMI) generated by a transformer and an instantaneous loading of a DC voltage source. The inverter circuit comprises a DC square wave voltage source, a bridge DC/AC converter, a transformer, a feedback control unit and a voltage control circuit wherein the voltage control circuit is coupled to the DC voltage source, the bridge DC/AC converter and the feedback control unit. The voltage control circuit is used to convert DC voltage provided by the DC voltage source into a two-level DC square wave, which in turn converts the two-level DC square wave into an AC quasi-sine wave to drive the fluorescent lamp through the bridge DC/AC converter and the transformer. The feedback control unit generates signals to control the voltage control circuit and the bridge DC/AC converter.

7 Claims, 5 Drawing Sheets

METHOD FOR DRIVING A FLUORESCENT LAMP AND AN INVERTER CIRCUIT FOR PERFORMING SUCH A METHOD

CROSS-REFERENCE TO RELATED APPLICATION

This application is a divisional application of, and claims the priority benefit of, U.S. application Ser. No. 11/198,143 filed on Aug. 04, 2005, which claims the priority benefit of Taiwan application Serial no. 94112524, filed on Apr. 20, 2005. All disclosure of the Taiwan application is incorporated herein by reference.

BACKGROUND OF THE INVENTION

1. Field of the Invention

The present invention generally relates to a method for driving a fluorescent lamp and a circuit for performing such a method, and more particularly to a method for driving an inverter circuit for the fluorescent lamp to reduce an instantaneous power source loading and amount of electromagnetic interference (EMI) generating by a transformer.

2. Description of Related Art

FIG. 1 is a conventional inverter circuit including a full bridge converter, which comprises a DC (direct current) voltage source 110, a bridge DC/AC (alternative current) converter 120, a transformer 130, a CCFL 140, an LCD 145, a voltage sensor 160, a current feedback 150 and a feedback control unit 170. The bridge DC/AC converter 120 comprises a switch A, a switch B, a switch C and a switch D, each of which comprises a metal-oxide-semiconductor field effect transistor (MOS FET) and a diode connected in parallel. More, the feedback control unit 170 comprises an error amplifier & control circuit 171, a drive circuit 173 and a pulse-width modulator 175. Furthermore, the CCFL 140 is disposed in the liquid crystal display 145.

One group comprised of the switch A and switch D and the other group comprised of the switch B and the switch C are alternatively turned on in accordance with a pulse signal provided by the drive circuit 173, whereby a DC square wave voltage outputted from the DC voltage source 110 is converted to an AC square wave with a high frequency. There occurs a voltage difference between nodes P1 and P2, which is an output of the bridge DC/AC converter 120. The DC square wave with a high frequency is then converted to an AC quasi-sine wave signal with a high frequency and a high voltage for driving the CCFL using the transformer 130 and capacitors C1 and C2.

Subsequently, the current feedback 150 senses a current signal passing through the CCFL 140, the voltage sensor 160 senses a voltage signal inputting to the CCFL 140 from a secondary winding of the transformer 130 and eventually the feedback control unit 170 proceeds with a negative feedback in accordance with the current signal and the voltage signal. Since a brightness of the CCFL 140 depends on a magnitude of a current passing through it, the error amplifier & control circuit 171 can compare the current with a predetermined value and output a range of control signals to a pulse-width modulator (PWM) 175 in accordance with a magnitude of a deviation of the current. An adjusted pulse-width AC square-wave signal can be obtained at a primary side of the transformer 130 by using the pulse-width modulator 175 and the drive circuit 173 to control a pulse-width of an output signal of the bridge DC/AC converter 120. The adjusted pulse-width AC square wave signal is then transformed to an AC quasi-sine waveform signal by the transformer 130 and the second capacitor C2, which in turn is inputted to the CCFL140, thereby achieving a purpose of stabilizing and adjusting the brightness of the CCFL140.

The detail operation of how to obtain the adjusted pulse-width of the AC square-wave output signal of the bridge DC/AC converter 120 is described as follows. After the AC quasi-sine waveform signal passes through the CCFL 140, the current feedback 150 senses a current signal outputted from the CCFL 140, and the voltage sensor 160 senses the AC quasi-sine waveform signal as well. Then, the error amplifier and control circuit 171 outputs a feedback control signal to the drive circuit 173 in accordance with the current signal outputted from the CCFL 140 and the AC quasi-sine waveform signal. Subsequently, the drive circuit 173 outputs an adjusted pulse-width driven signal to the bridge DC/AC converter 120, which in turn outputs an AC adjusted pulse-width square wave to the primary side of the transformer 130, thereby forming a negative feedback loop for driving the CCFL 140. Subsequently, the AC adjusted pulse-width square wave is converted to an AC quasi-sine wave for driving the CCFL 140, thereby achieving a purpose of stabilizing and adjusting the brightness of the CCFL140.

FIG. 2 shows voltage timing charts present at several components in the circuit shown in FIG. 1, from which it can realized that how an AC square wave with an adjusted pulse-width is obtained from the bridge DC/AC converter 120. In FIG. 2, WAV_A, WAV_B, WAV_C and WAV_D show turn-on timing charts of the switch A 121, the switch B 123, the switch C 125 and the switch D 127, respectively, wherein in WAV_B, the term of "B_ON" stands for an on-state of the switch B; likewise, the similar terms apply to WAV_B, WAV_C, WAV_D. More, WAV_E shows a dead-time timing chart generating from the drive circuit 173, by which the switch A 121 is turned off and the switch B 123 is turned on after a while i.e. the switch A and the switch B are not turned on at the same time due to a transition state period from a low level to a high level or from a high level to a low level As a result, pulses D3 and D4 can prevent the switches A and B from being turn on simultaneously. WAV_F chart shows "switching timing" of the bridge DC/AC converter 120, wherein the term of "B and C_ON" stands for the switched B and C being turned on simultaneously and the term of "A and D_ON" stands for the switched A and D being turned on simultaneously. As an operation of the full bridge DC/AC converter 120, it can convert a DC voltage output from the DC voltage source 110 to an AC square wave by alternatively turning on one group switched consisted of switches A and D and the other group switched consisted of switches B and C in accordance with pulses provided by the drive circuit 173.

In addition, "Primary Driving Voltage" shows an AC square wave with a positive voltage VCC1 and a negative voltage−VCC1 outputted from the bridge DC/AC converter 120 to the primary winding of the transformer 130. Finally, "Secondary Voltage" shows an AC quasi-sine waveform signal present at a joint node between the second capacitor C2 and the CCFL 140.

Obviously, from "Primary Driving Voltage" in the FIG. 2, an instantaneous loading of the DC voltage source 110 is too high because it is used to generate a single-level square wave with a high voltage VCC1. If the instantaneous DC voltage source 110 is used to generate a two-level or multi-level square wave, its loading can be alleviated due to a smaller voltage variation. Besides, electromagnetic radiating wave generated by the transformer 130 can interfere other components in a mother board, which results in an electromagnetic interference (EMI) phenomenon. In addition, EMI also affects a read/write malfunction of a CPU. Most importantly, the bridge DC/AC converter 120 is particularly susceptible to EMI. Once the bridge DC/AC converter 120 is interfered by EMI, it can not function normally so that a stabilized operating current for driving the CCFL can not obtained, which causes the CCFL 140 to have an unstable brightness. Also, the CPU interfered by EMI causes a computer, such as a notebook computer and a palm computer, to have a malfunction.

Therefore, it is needed to provide a method for alleviating EMI generated by the transformer in the inverter circuit for driving the CCFL in a field of manufacturing a liquid crystal display. Furthermore, by reducing amount of EMI generated by the transformer, a purpose of maintaining a stable brightness of the CCFL can be achieved.

SUMMARY OF THE INVENTION

Accordingly, the present invention is directed to an inverter circuit for driving a CCFL, which employ a characteristic of a two-level or multi-level DC square wave at a primary winding of a transformer, thereby reducing amount of EMI generated by the transformer.

The present invention is directed to a method for driving a CCFL, which forms a two-level or multi-level DC square wave at a primary winding of a transformer, thereby reducing amount of EMI generated by the transformer.

According to an embodiment of the present invention, an inverter circuit for driving a CCFL is provided. The inverter circuit comprises a DC voltage source, a bridge DC/AC converter, a transformer, a feedback control unit and a voltage control circuit wherein the voltage control circuit is coupled to the DC voltage source, the bridge DC/AC converter, a feedback control unit and the voltage control circuit, wherein the DC voltage source is coupled to the voltage control circuit. In addition, the voltage control circuit is coupled to the bridge DC/AC converter, which in turn is coupled to the CCFL through the transformer and the CCFL is coupled to the feedback control unit. Finally, the feedback control unit generates a feedback signal to the voltage control circuit and the bridge DC/AC converter in accordance with a current pass through the CCFL.

The present invention is characterized in that first, a voltage control circuit generates a two-level DC square wave, which is converted to an AC square wave by through a bridge DC/AC converter. The AC square wave is then input into a primary side of a transformer, which outputs an AC quasi-square wave at its secondary side and the AC quasi-square wave passes through the CCFL. Since an amount of EMI generated by the transformer is proportional to a magnitude of a voltage variation present at the primary side thereof, the present invention can significantly reduce EMI due to a smaller voltage variation of the two-level or multi-level square wave and thus effectively prevent a bridge DC/AC converter from being damaged by EMI. More, since there is a smaller step-height in the two-level or multi-level square wave than a single-level square wave, an instantaneous loading of the DC voltage source can be considerably reduced.

For the sake of clarified description, the “two-level square wave,” used herein, refers to two square waves with two voltage levels (VCC1 and VCC2) and the “two-level square wave” is converted to “four-level square wave” with four voltage levels (VCC1,−VVCC1, VCC2,−VCC2).

In addition, the feedback control unit provides a voltage control signal for controlling the voltage control circuit to adjust pulse widths of each voltage level (such as VCC1 and VCC2, in accordance with the current passing through the CCFL. More, the feedback control unit provides pulse-width modulation (PWM) signals for controlling the bridge DC/AC converter’s converting the two-level DC square wave to four-level AC square wave, thereby achieving a purpose of stabilizing a brightness of the CCFL by using a negative feedback mechanism.

According to one embodiment of the present invention, the voltage control circuit comprises a two-level DC voltage generator and an analog device, wherein the two-level DC voltage generator is coupled to a DC voltage source and generates a first DC voltage (such as VCC1) and a second DC voltage with two different voltage levels. In addition, the analog device converts voltage control signals to a two-level DC square wave with the first DC voltage and the second DC voltage in accordance with the first DC voltage and the second DC voltage provided by the two-level DC voltage generator. Therefore, voltage levels of the two-level DC square wave can be adjusted by using the two-level DC voltage generator.

Furthermore, the feedback control unit comprises an error amplifier and control circuit, a pulse-width modulator and a drive circuit. More, the error amplifier and control circuit receives a current passing through the CCFL and then output pulse-width modulating signals for controlling the pulse-width modulator to output feedback PWM signals to the bridge DC/AC converter in accordance with the current. The drive voltage for driving the CCFL can be adjusted by the feedback PWM signals, and then controls the current passing through the CCFL, thereby stabilizing the brightness of the CCFL.

To adjust pulse widths and voltage levels of the two-level DC square wave, the pulse-width modulator at least comprises a triangle-wave generator, a first comparator, a second comparator and an exclusive-OR gate to provide the aforementioned voltage control signals.

In addition, the triangle-wave generator is used to provide a triangle wave. The first comparator compares the triangle wave with a first reference voltage and then outputs a first periodic square wave with a pulse width that is a duration in which the voltage level of the triangle wave is higher than that of the first reference voltage. Likewise, the second comparator compares the triangle wave with a second reference voltage and then outputs a second periodic square wave with a pulse width that is a duration in which the voltage level of the triangle wave is higher than that of the second reference voltage Subsequently, the outputs of the first comparator and the second comparator are input to the exclusive-OR gate to proceed to an exclusive-OR operation. As a result, the aforementioned voltage control signals are obtained. By adjusting voltage levels of the first reference voltage and the second reference voltage, pulse widths of the first periodic square wave and the second periodic square wave can accordingly be adjusted.

In addition, the voltage control signals output from the exclusive-OR gate can be further designed to first pass an inverter gate for obtaining a better digital wave shape and then output to the voltage control circuit, as can be easily modified by one of ordinary skill in the art. More, the two-level DC square wave can be designed to multi-level (for example, three-level) by only replacing the two-level DC voltage generator in the voltage control circuit with a multi-level DC voltage generator that provides multi-level voltages. Meanwhile, a generating method for generating multiple voltage control signals is modified, for example, implementing a plurality of comparators and a plurality of reference voltages. It is obviously that the DC square wave with the more level voltage, the required circuit is more complicated.

A method for driving a fluorescent lamp of the present invention comprises first, converting a DC voltage source to a two-level (multi-level) DC periodic square, which is then converted to an AC square wave. After that, the AC square wave is converted to an AC quasi-sine wave prior to inputting to the CCFL. The method for driving a fluorescent lamp of the present invention is characterized in that a voltage for driving the CCFL is converted from the two-level (multi-level) DC periodic square, which has a smaller voltage variation and accordingly causes EMI generated from the transformer and an instantaneous voltage loading to be reduced The method for driving a fluorescent lamp of the present invention further comprises detecting the current passing through the CCFL, according to which PWM signals are generated. The PWM signals facilitates the two-level (multi-level) DC periodic square to be converted to the AC square wave, which is a conventional feedback control method for stabilizing the brightness of the CCFL.

The method for driving a fluorescent lamp of the present invention further comprises obtaining the voltage control signals by using the exclusive-OR gate's operating an exclusive-OR with the first and the second periodic square waves and implementing the voltage control signals to control pulse widths of two-level (multi-level) DC periodic square.

In addition, a method for generating the first and the second periodic square waves comprises implementing comparisons between the first and the second reference voltages with different voltage levels, and the triangle waves. For example, a pulse width of the first periodic square wave can be designed to be a duration in which the voltage of the triangle wave is larger than that of the first reference voltage. Likewise, a pulse width of the second periodic square wave can be designed to be a duration in which the voltage of the triangle wave is larger than that of the second reference voltage.

Based on the above description and preferred embodiments of the present invention, problems of EMI generated by the transformer and a high DC voltage source loading can be resolved, Thus, the present invention not only stabilizes a brightness of the CCFL but prevents the inverter from malfunction because of reducing amount of EMI generated by the transformer. Furthermore, a read/write process of a CPU can not interfered by electromagnetic radiation generated by the transformer so as to ensure a computer working normally.

The objectives, other features and advantages of the invention will become more apparent and easily understood from the following detailed description of the invention when taken in conjunction with the accompanying drawings.

BRIEF DESCRIPTION OF THE DRAWINGS

The accompanying drawings are included to provide a further understanding of the present invention, and are incorporated in and constitute a part of this specification. The drawings illustrate embodiments of the invention and, together with the description, serve to explain the principles of the invention.

DESCRIPTION OF THE EMBODIMENTS

Reference will now be made in detail to an inverter circuit of a present preferred embodiment of the invention, examples of which are illustrated in the accompanying drawings.

Figure 3:
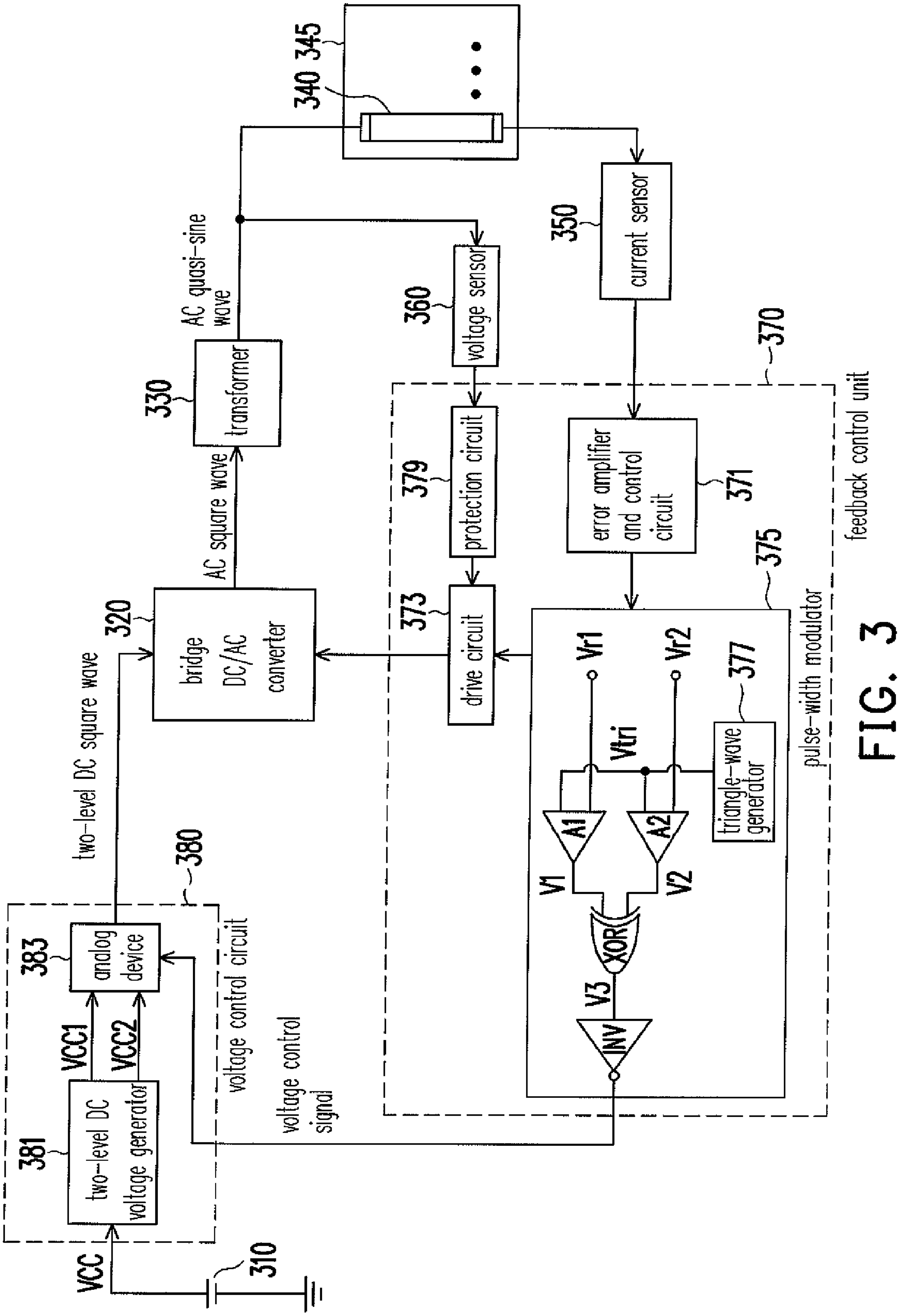
FIG. 3 is an inverter circuit according to a preferred embodiment of the present invention.

Referring to FIG. 3, it shows an inverter circuit according to an embodiment of the present invention. The inverter circuit for driving a CCFL 340 of the present invention is provided. The inverter circuit comprises a DC voltage source 310, a bridge DC/AC converter 320, a transformer 330, a current sensor 350, a voltage sensor 360, a feedback control unit 370 and a voltage control circuit 380, wherein the CCFL 340 is arranged into a liquid crystal display panel 345.

Figure 1:
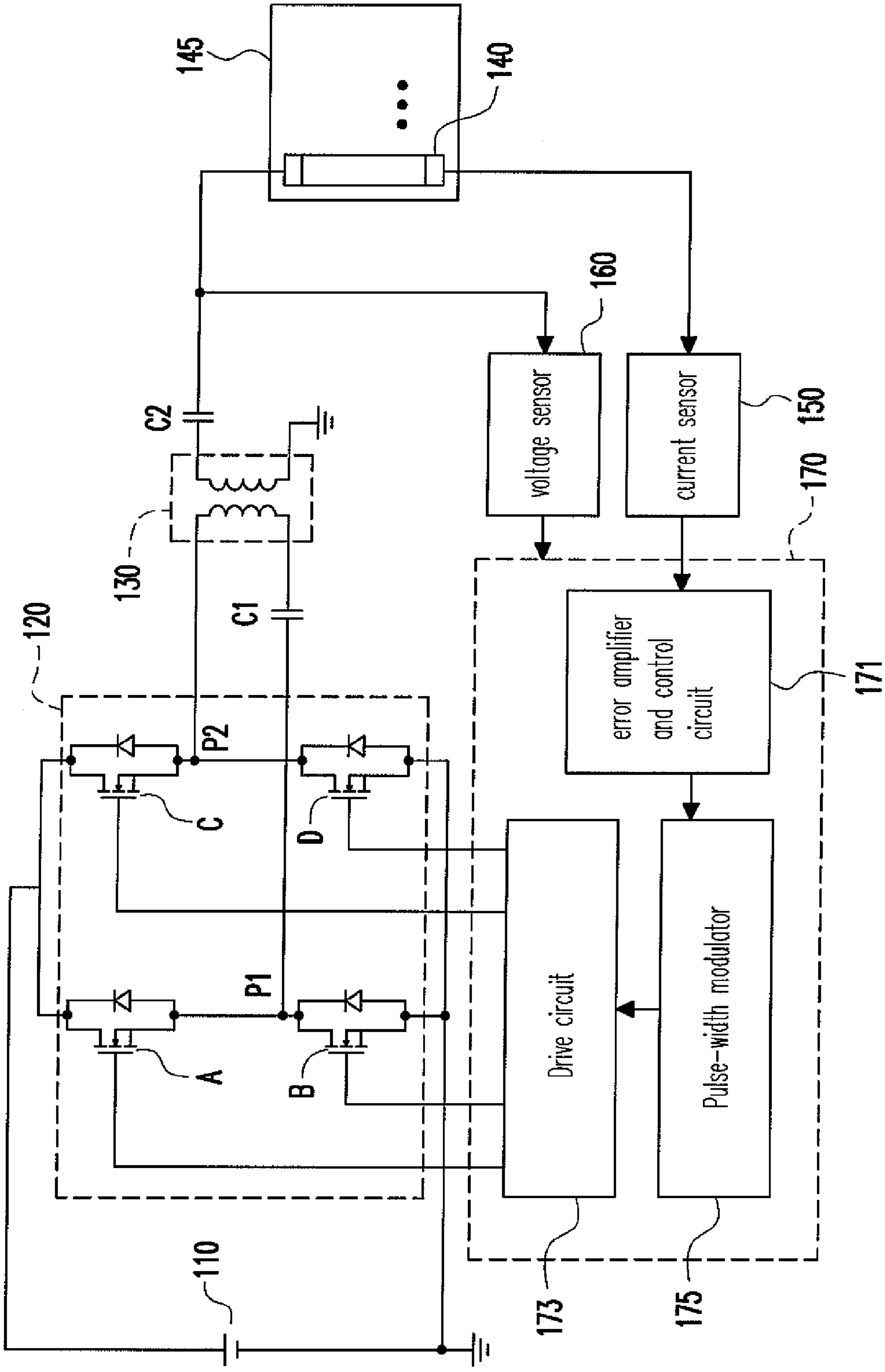
FIG. 1 (PRIOR ART)
FIG. 1 is a conventional inverter circuit including a full bridge converter.
Figure 2:
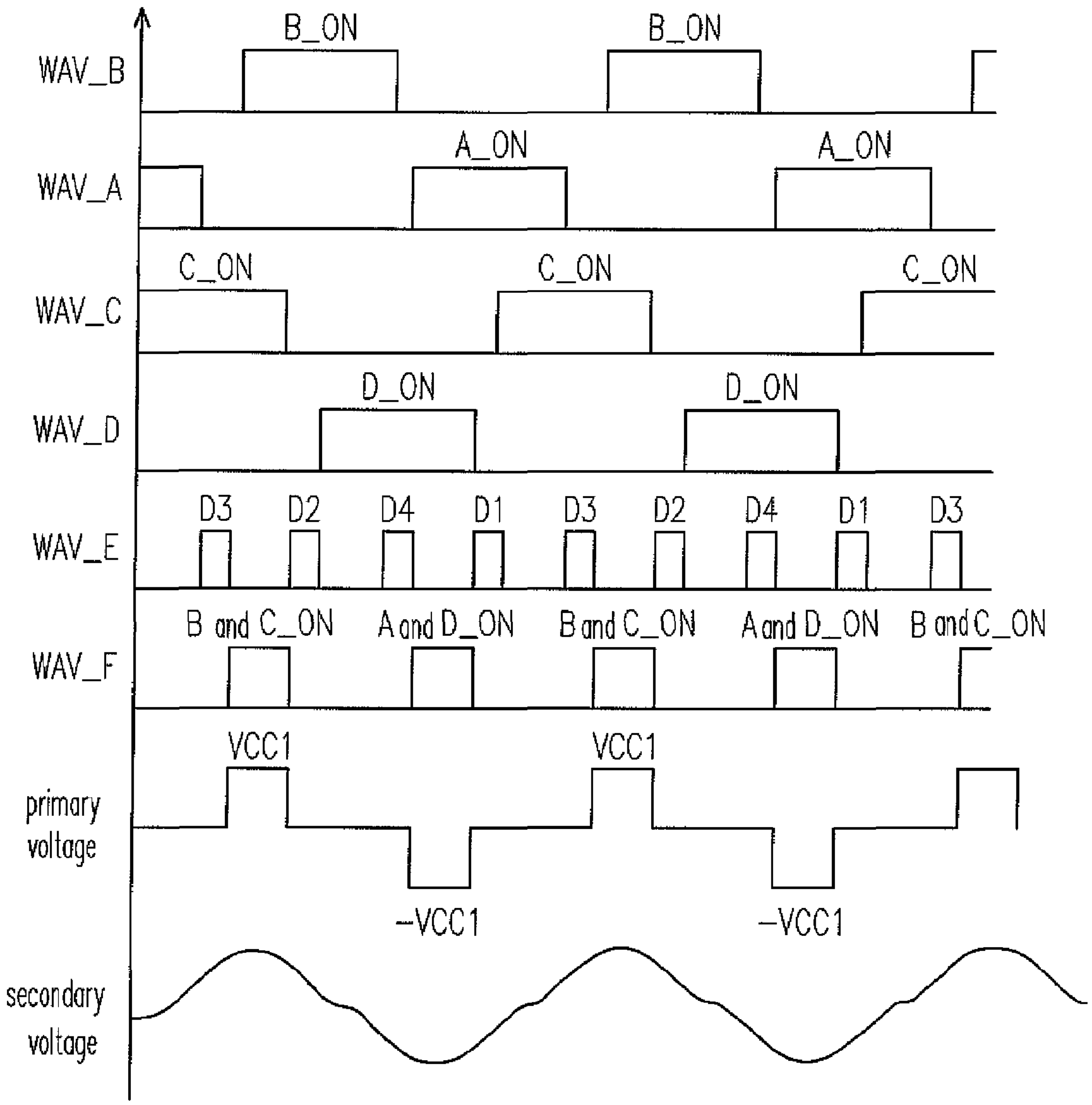
FIG. 2 (PRIOR ART)
FIG. 2 shows voltage timing charts present at several nodes in the circuit shown in FIG. 1.

In addition, in FIG. 3, a negative feedback circuit comprised of a bridge DC/AC converter 320, a current sensor 350, a voltage sensor 360 and current feedback unit 370 is used to stabilize a brightness of the CCFL 340, an operation of which is the same as that in FIG. 1 and is not described here again. In addition, the bridge DC/AC converter 320 can be chosen to be the same as the bridge DC/AC converter 120 shown in FIG. 1.

Figure 4:
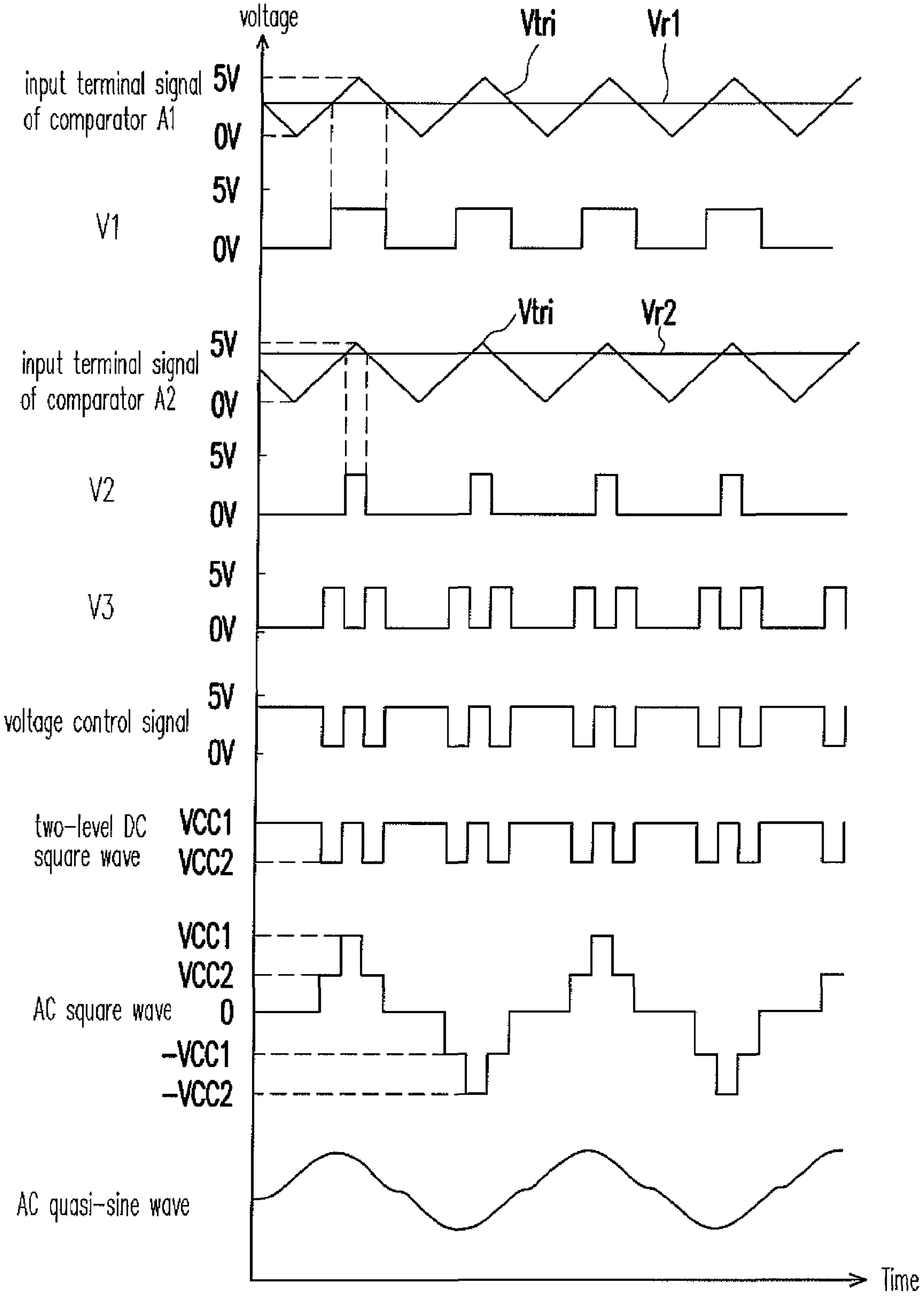
FIG. 4 shows voltage timing charts present at several nodes in the inverter circuit shown in FIG. 3.

Compared with the conventional inverter circuit, the present invention is featured in that the feedback control unit 370 and the voltage control circuit 380 so that the following description describes these two devices accompanied with FIG. 4. More, FIG. 4 shows voltage timing charts present at several nodes in the inverter circuit shown in FIG. 3.

The feedback control unit 370 comprises an error amplifier and control circuit 371, a pulse-width modulator 375 and a drive circuit 373. More, the error amplifier and control unit 370 further comprises a protection device 379 coupled between the drive circuit 373 and the voltage sensor 360. The protection device 379 can achieve a purpose of protecting the inverter circuit through the drive circuit 373, when a voltage variation at the secondary side of the transformer detected by the voltage sensor 360 is abnormal.

In the conventional techniques, the pulse-width modulator 375 receives an output from the error amplifier and control circuit 371 and thus adjusts pulse widths of output signals from the bridge DC/AC converter 320 by using the drive circuit 373. In addition, the pulse-width modulator 375 further comprises a triangle-wave generator 377, a first comparator A1, a second comparator A2 and an exclusive-OR gate to provide voltage control signals to the voltage control circuit 380.

Furthermore, the triangle-wave generator 377 provides a triangle-wave Vtri to the first comparator A1 and the second comparator A2. Referring to waveforms in "input terminal of comparator A1" and "V1" shown in FIG. 4, the first comparator A1 compares the triangle-wave Vtri with the first reference voltage Vr1, and then outputs a first periodic square wave V1 with a pulse width that is a duration in which the voltage level of the triangle-wave Vtri is higher than that of the first reference voltage Vr1.

Likewise, referring to waveforms in "input terminal of comparator A2" and "V2" shown in FIG. 4, the first comparator A2 compares the triangle-wave Vtri with the second reference voltage Vr2, and then outputs a second periodic square wave V2 with a pulse width that is a duration in which the voltage level of the triangle-wave Vtri is higher than that of the second reference voltage Vr2. Subsequently, the first periodic square wave V1 and the second periodic square wave V2 are input into the exclusive-OR gate to proceed to an exclusive-OR operation so as to output a signal V3, shown in "V3" waveform in FIG. 4. To obtain a better digital wave shape, the signal V3 is inverted by an inverter gate INV to be an inverting waveform of V3, i.e. the voltage control signal, shown in "voltage control signal" waveform in FIG. 4.

By adjusting the magnitudes of the first reference voltage Vr1 and the second reference voltage Vr2, the pulse widths of the first periodic square wave V1 and the second periodic square wave V2 can be accordingly adjusted. As the voltage control signal is obtained from operating the first periodic square wave V1 and the second periodic square wave V2 with the exclusive-OR operation, in fact, the voltage control signal is determined by the first reference voltage Vr1 and the second reference voltage Vr2.

Furthermore, the voltage control circuit 380 for receiving the voltage control signal comprises a two-level DC voltage generator 381 and an analog device 383, wherein the two-level DC voltage generator 381 generates a first DC voltage VCC1 and a second DC voltage VCC2 with different voltage levels in accordance with the DC voltage provided by the DC voltage source 310. More, the analog device 383 amplifies the amplitude of voltage control signal to the aforementioned first DC voltage VCC1 and a second DC voltage VCC2 with different voltage levels in response to the input DC voltages VCC1 and VCC2 as shown in "two-level DC square wave" in FIG. 4.

in addition, the analog device 383 further receives the voltage control signal that controls pulse widths of each voltage level in the two-level DC square wave. After the two-level DC square wave is converted by the bridge DC/AC converter 320 to ac AC square wave, its duty cycle is also determined by the voltage control signal.

From "V1," "V2," and "AC square wave" shown in FIG. 4, a duty cycle of the AC square wave is determined by the signal with a larger pulse width of two "V1" and "V2" signals. For example, the larger pulse width of "V1" signal, the larger the duty cycle of the AC square wave, which means that the passing energy is larger. The smaller pulse width of two "V1" and "V2" signals determines the duration ratio between two "V1" and "V2" signals; for example, the smaller pulse width of "V2" signal, the smaller the duration ratio of VCC1 to VCC2.

In summary, the two-level DC voltage generator 381 is used to determine the voltage levels for each level in the two-level DC square wave and the pulse-width modulator 375 output the voltage control signal for adjusting the duration ratio of each level in the two-level DC square wave. Therefore, the voltage variation at the primary side of the transformer 330 becomes smaller so as to reduce EMI generated by the transformer 330 and lower instantaneous loading of the DC voltage source.

Furthermore, the pulse widths of two "V1" and "V2" signals can be determined by the first reference voltage Vr1 and the second reference voltage Vr2. In addition, the first reference voltage Vr1 and the second reference voltage Vr2 can be designed to be determined by the error amplifier and control circuit 371 in accordance with the current passing through the CCFL. Alternatively, the smaller voltage of the first reference voltage Vr1 and the second reference voltage Vr2 can be defaulted as a DC reference voltage in the feedback control unit.

The duration ratio of each level in the two-level DC square wave is determined by the smaller voltage of two DC reference voltages Vr1 and Vr2 (in this embodiment, the smaller one is Vr1), and has a little effect on the brightness of the CCFL. Therefore, the value of this duration ratio can be fixed. However, the duty cycle of the AC square wave is able to affect the brightness of the CCFL and the duty cycle is determined by the larger voltage of two DC reference voltages Vr1 and Vr2 (in this embodiment, the larger one is Vr2). Therefore, the second DC reference voltages Vr2 is designed to be determined by the error amplifier and control circuit 371 in accordance with the current passing through the CCFL.

The two-level DC square wave can be designed to be a multi-level DC (such as three-level or more) square wave by only replacing the two-level DC voltage generator 381 in the voltage control circuit 380 with a multi-level DC voltage generator that provides multi-level voltages. Meanwhile, a generating method for generating multiple voltage control signals is modified, for example, implementing a plurality of comparators and a plurality of reference voltages, which can easily modified by one of ordinary skill in the art.

Figure 5:
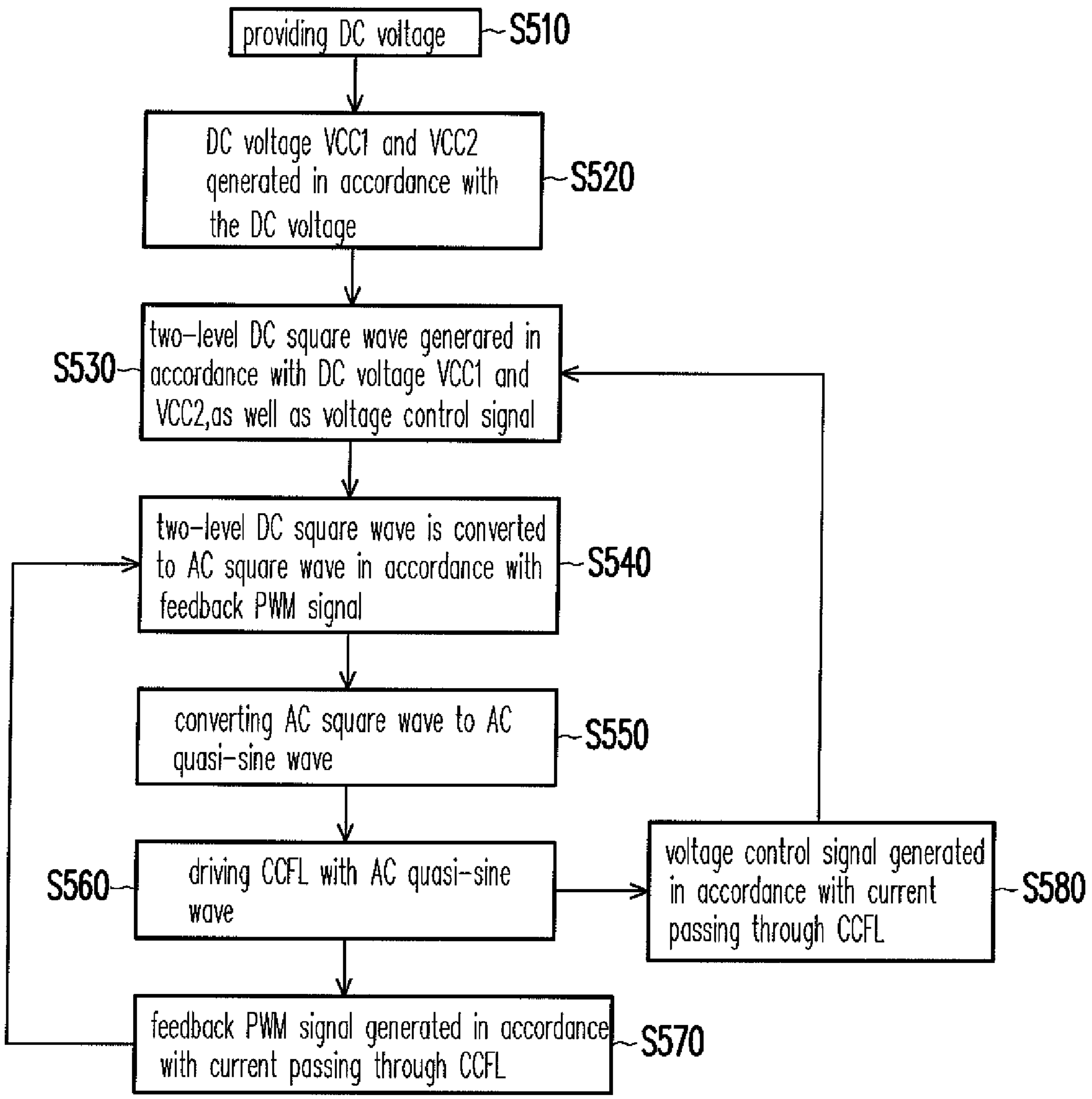
FIG. 5 shows a flowchart of a driving method for driving a CCFL of the present invention.

FIG. 5 shows a flowchart of a driving method for driving a CCFL of the present invention. Referring to FIGS. 3 and 5 concurrently, first, in a step S510, the DC voltage source 310 provides a DC voltage. Next, in step S520, the two-level DC voltage generator 381 generates the first DC voltage VCC1 and the second DC voltage VCC2 with different voltage levels. After that, in step S530, the analog device 383 generates the two-level DC square wave in accordance with the VCC1 and VCC2, as well as the voltage control signal.

In step S540, the bridge DC/AC converter 320 modulates the two-level DC square wave's pulse width and executes a converting from DC square wave to AC square wave in accordance with the feedback PWM signal. Subsequently, the transformer 330 converts the AC square wave to a quasi-sine wave in step S550 and then the quasi-sine wave drives the CCFL in step S560. In step S570, the feedback control unit 370 generates a feedback PWM signal provided to be used in step S540 in accordance with the current passing through the CCFL so as to stabilize the brightness of the CCFL. Next, in step S580, the feedback control unit 370 generates a feedback PWM signal in accordance with the current passing through the CCFL provided to be used in step S530 for generating the two-level DC square wave.

In summary, a method for driving a fluorescent lamp and an inverter circuit for performing such a method of the present invention not only eliminates problems of EMI generated by the transformer, but reduces the instantaneous loading of the DC voltage source. Thus, the present invention not only stabilizes a brightness of the CCFL but prevents the inverter from malfunction because of reducing amount of EMI generated by the transformer. Furthermore, a read/write process of a CPU can not interfered by electromagnetic radiation generated by the transformer so as to ensure a computer working normally.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method for driving a fluorescent lamp, comprising:

converting a DC voltage to a two-level DC square wave;

converting the two-level DC square wave to an AC square wave;

converting the AC square wave to a quasi-sine wave for driving the fluorescent lamp; and generating a feedback pulse width modulating signal in accordance with the current passing through the fluorescent lamp to facilitate the two-level DC square wave to be converted to an AC square wave.

2. The method for driving a fluorescent lamp according to claim 1, further comprises:

detecting a current passing through the fluorescent lamp.

3. The method for driving a fluorescent lamp according to claim 1, wherein the fluorescent lamp is a cathode cold fluorescent lamp.

4. The method for driving a fluorescent lamp according to claim 1, further comprises:

detecting a current passing through the fluorescent lamp;

generating a first DC reference voltage and a second DC reference voltage in accordance with the current passing through the fluorescent lamp;

generating a voltage control signal in accordance with the first DC reference voltage and the second DC reference voltage; and adjusting a duration of each level in the two-level DC square wave by using the voltage control signal.

5. The method for driving a fluorescent lamp according to claim 4, wherein the first DC reference voltage is larger than the second DC reference voltage, the first DC reference voltage determines a duty cycle of the AC square wave and the second DC reference voltage determines a duration of each level in the two-level DC square wave.

6. The method for driving a fluorescent lamp according to claim 1, further comprises:

detecting a current passing through the fluorescent lamp;

generating a second DC reference voltage in accordance with the current passing through the fluorescent lamp;

generating a voltage control signal in accordance with the first DC reference voltage and the second DC reference voltage; and adjusting a duration of each level in the two-level DC square wave by using the voltage control signal.

7. The method for driving a fluorescent lamp according to claim 6, wherein the first DC reference voltage is larger than the second DC reference voltage, the first DC reference voltage determines a duty cycle of the AC square wave and the second DC reference voltage determines a duration of each level in the two-level DC square wave.

* * * * *